United States Patent
Bassov et al.

(10) Patent No.: US 10,509,676 B1
(45) Date of Patent: Dec. 17, 2019

(54) TECHNIQUES FOR OPTIMIZING ENTROPY COMPUTATIONS

(71) Applicant: EMC IP Holding Company LLC, Hopkinton, MA (US)

(72) Inventors: Ivan Bassov, Brookline, MA (US); Istvan Gonczi, Berkley, MA (US); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,694

(22) Filed: Oct. 29, 2018

(51) Int. Cl.
  *H04N 19/91* (2014.01)
  *G06F 9/50* (2006.01)
  *G06F 13/20* (2006.01)

(52) U.S. Cl.
  CPC .......... *G06F 9/5016* (2013.01); *G06F 13/20* (2013.01); *G06F 2213/0062* (2013.01)

(58) Field of Classification Search
  CPC .................................................. H04N 19/91
  See application file for complete search history.

(56) References Cited

U.S. PATENT DOCUMENTS

| | | | | |
|---|---|---|---|---|
| 5,561,421 A | * | 10/1996 | Smith | G06T 9/005 341/106 |
| 5,850,565 A | * | 12/1998 | Wightman | H03M 7/3084 710/1 |
| 5,870,036 A | * | 2/1999 | Franaszek | H03M 7/3086 341/51 |
| 2009/0096642 A1 | * | 4/2009 | Stein | H03M 7/40 341/51 |
| 2012/0242517 A1 | * | 9/2012 | Seo | H03M 7/40 341/52 |

OTHER PUBLICATIONS

Kedarnath J. Balakrishnan et al, "Relationship Between Entropy and Test Data Compression", IEEE Transactions on Computer-Aided Design of Integrated Circuits and Systems, vol. 26, No. 2, Feb. 2007 (Year: 2007).*

(Continued)

*Primary Examiner* — Farley Abad
(74) *Attorney, Agent, or Firm* — Muirhead and Saturnelli, LLC

(57) ABSTRACT

Techniques for data processing may include: computing an entropy value for the chunk; determining, in accordance with the entropy value for the data chunk, whether the data chunk is compressible; and responsive to determining the data chunk is compressible based on the entropy value for the chunk, compressing the data chunk. The entropy value may be determined using counters for data items where the counters denote current frequencies of different allowable data items in the data chunk; and performing second processing using the counters to determine an entropy value for the data chunk, wherein said second processing includes selecting a precomputed binary logarithmic value from a table for each of the counters. The table may include integer representations of binary logarithmic values. The second processing may include loading multiple data items of the chunk into a register, extracting each data item from the register and incrementing a corresponding counter.

25 Claims, 10 Drawing Sheets

(56) References Cited

OTHER PUBLICATIONS

Kedarnath J. Balakrishnan, et al., "Relationship Between Entropy and Test Data Compression," IEEE Transactions on Computer-Aided Design of Integrated Circuits and Systems, vol. 26, No. 2, Feb. 2007.
"Entropy (information theory)," Wikipedia, https://en.wikipedia.org/wiki/Entropy_(information_theory), Sep. 9, 2018.
Computer Forensics, Malware Analysis & Digital Investigations: File Entropy, "File Entropy explained," http://www.forensickb.com/2013/03/file-entropy-explained.html, Mar. 20, 2013.
Werner Ebeling, et al., "Entropy and Compressibility of Symbol Sequences," PhysComp96, Feb. 23, 1997.

\* cited by examiner

```
#define BYTE_VALUES 256                                    ─── 608
int entropy_comp_size_est_ref(unsigned char * buf,  // input buffer
                              int len )              // buffer length in bytes
}                                                                              ⎫
                                                                               ⎬ 610
// Counters handle up to 64k blocks                                            ⎭
unsigned short hist[BYTE_VALUES] = {0};  ─── 621  ⎫
float f_entropy = 0;                              ⎬ 620
float f_len = (float) len;                        ⎭
int i;

// Compute byte frequencies for buffer    ⎫
for (i = 0; i < len; i++){                ⎬ 630
    hist[ buf[i] ]++;                     ⎭
}

// Process the histogram and compute Shannon entropy of buffer                 ⎫
for (i = 0; i < BYTE_VALUES; i++) {                                            ⎪
    unsigned int h = hist[i];                                                  ⎪
    if (h != 0){                                                               ⎬ 640
        float f_freq = (float) h / f_len;          ─── 642                     ⎪
        f_entropy -= f_freq * log2f(f_freq);       ─── 644                     ⎪
    }                                                                          ⎭
}

// Convert the entropy into "compressed size" estimate    ⎫
return (int)(f_entropy * f_len/8);                        ⎬ 650
}                                                         ⎭
```

FIG. 6

Precomputed table initialization for up to 8K IO buffers:

define BYTE_VALUES 256
define L2_PRECISION 100000000LLU //To preserve accuracy of the precomputed int log table unsigned long long l2_8k_table[DBUF_8K_LEN];   // Precomputed log2(x) values for x in the range 0..8K, inclusively // Precomputed log2 entry for buffer/chunk size of 8192
define L2_8K 13LLU * L2_PRECISION void init_l2_8k_table(void)
{
    int i;
    l2_8k_table[0] = 0ULL; // gets around log2f(0) == ERR ——741
    for (i=1; i < DBUF_8K_LEN; i++) {
        l2_8k_table[i] = (unsigned long long) (log2f((float)i) * L2_PRECISION); ——742
    }
}

FIG. 7B

```
int entropy_comp_size_est_xmm_8k(unsigned char * buf) // input buffer ——— 810
{
    unsigned int hist[BYTE_VALUES] __attribute__((aligned(64))) ={0}; ——— 822
    __m128i t;  // 16 byte "line" buffer ——— 824                              } 820
    unsigned long long entropy = 0; ——— 826
    unsigned int h, i, x; ——— 828

// Compute "byte value frequency histogram" of buffer
    for (i = 0; i < DBUF_8K_LEN; i+= 16) {
        // Read 16 bytes into an xmm register
        t = _mm_loadu_si128((__m128i*) (&buf[i])); ——— 832
        // Extract 1 byte at a time inline for unrolled second inner loop
        x = _mm_extract_epi8(t,0);  hist[x]++; ——— 834          }
        // ... obvious repetitions omitted for clarity..                 } 835    } 830
        x = _mm_extract_epi8(t,15); hist[x]++; ——— 836
    }  ——— 831

// Process the histogram to Compute Shannon entropy
    for (i = 0; i < BYTE_VALUES; i++) {
        h = hist[i];
        entropy += (unsigned long long) h * (L2_8K - l2_8k_table[h]); ——— 842   } 840
    }

// Convert entropy to compressed size estimate
    return (int) (entropy/L2_PRECISION/8); ——— 850
}
```

FIG. 8

TECHNIQUES FOR OPTIMIZING ENTROPY COMPUTATIONS

BACKGROUND

Technical Field

This application generally relates to performing entropy computations and, in particular, optimizing entropy computations for improved performance.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of data processing comprising: receiving a data chunk including a plurality of data items; performing first processing that computes an entropy value for the data chunk, wherein the first processing includes: determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and performing second processing using the plurality of counters to determine an entropy value for the data chunk, wherein said second processing includes selecting a precomputed binary logarithmic value from a table for each of the plurality of counters; and determining, in accordance with the entropy value for the data chunk, whether the data chunk is compressible; and responsive to determining the data chunk is compressible based on the entropy value for the chunk, compressing the data chunk. Responsive to determining the data chunk is not compressible, the data chunk may be stored in its uncompressed form. Compressing the data chunk may produce a compressed form of the data chunk and, after compressing the data chunk, other processing may be performed that includes: determining whether the compressed form of the data chunk achieves at least a minimum amount of data reduction; and responsive to determining the data chunk does not achieve at least the minimum amount of data reduction, storing the data chunk in its uncompressed form. The method may include: storing the data chunk in its compressed form responsive to determining the data chunk does achieve at least the minimum amount of data reduction; determining, in accordance with the entropy value for the data chunk, whether the data chunk is compressible may include determining whether the entropy value for the data chunk is less than an entropy threshold; and if the entropy value for the data chunk is less than the entropy threshold, determining that the data chunk is compressible and otherwise determining that the data chunk is not compressible. The data chunk may have a size that is a number of bytes, N, denoting a range defined from a minimum value of zero and a maximum value of N, and wherein the table may include precomputed binary logarithmic values for each value in the range. Each precomputed binary logarithmic value in the table may be stored as an integer denoting an integer representation of said each precomputed binary logarithmic value in accordance with a specified precision multiplication factor. Each precomputed binary logarithmic value may be determined by dividing the integer representation of each precomputed binary logarithmic value as stored in the table by the specified precision multiplication factor. The plurality of data items of the chunk may be stored in a buffer, and wherein determining a plurality counters for data items occurring in the data chunk may include storing multiple data items from the buffer into a single register; and extracting each of the multiple data items from the single register and incrementing a corresponding one of the plurality of counters associated with said each data item. The data chunk may have a size that is a number of bytes, N, and wherein performing second processing using the plurality of counters to determine an entropy value for the data chunk may include for each of the plurality of counters, computing a first value that is a mathematical difference of a first binary logarithm of N and a second binary logarithm that is the precomputed binary logarithmic value selected from the table for said each counter. Performing second processing using the plurality of counters to determine an entropy value for the data chunk further may include for each of the plurality of counters, determining a second value for said each counter that is a mathematical product of the first value computed for said each counter and a frequency value denoted by said each counter. The method may include determining a third value as a result of a mathematical division operation of a sum of the second values determined for the plurality of counters divided by the specified precision multiplication factor; and calculating the entropy value for the data chunk as a result of a mathematical division operation of the third value divided by N. The method may include determining an estimated compressed size for the data chunk using the entropy value. Any of the entropy value and the estimated compressed size may be used in said determining, in accordance with the entropy value for the data chunk, whether the data chunk is compressible. The entropy value for the data chunk may be determined inline as part of I/O path processing for the data chunk. The method may or may not be performed inline as part of I/O path processing for the data chunk.

In accordance with another aspect of techniques herein is a computer readable medium comprising code stored thereon that, when executed, performs method of data processing comprising: receiving a data chunk including a plurality of data items; performing first processing that computes an entropy value for the data chunk, wherein the first processing includes: determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and performing second processing using the plurality of counters to determine an entropy value for the data chunk, wherein said second processing includes selecting a precomputed binary logarithmic value from a table for each of the plurality of counters; and determining, in accordance with the entropy value for the data chunk, whether the data chunk is compressible; and responsive to determining the data chunk is compressible based on the entropy value for the chunk, compressing the data chunk.

In accordance with another aspect of techniques herein is a system comprising: a processor; and a memory comprising code stored thereon that, when executed, performs a method of data processing comprising: receiving a data chunk including a plurality of data items; performing first processing that computes an entropy value for the data chunk, wherein the first processing includes: determining a plurality of counters for the data chunk, wherein a first portion of data items allowable in the data chunk are mapped to the plurality of counters, wherein each of the plurality of counters is associated with a particular data item of the first portion of data items allowable and denotes a current frequency of the particular data item determined with respect to the data chunk; and performing second processing using the plurality of counters to determine an entropy value for the data chunk, wherein said second processing includes selecting a precomputed binary logarithmic value from a table for each of the plurality of counters; and determining, in accordance with the entropy value for the data chunk, whether the data chunk is compressible; and responsive to determining the data chunk is compressible based on the entropy value for the chunk, compressing the data chunk. The plurality of counters for the data chunk may be determined with respect to a selected portion of the plurality of data items of the data chunk. The data chunk may include a first number of data items and the selected portion may include a second number of data items where the second number is less than the first number. Each of the plurality of counters that is associated with a particular data item of the first portion of data items allowable may denote a current frequency of the particular data item in the selected portion.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example of code implementing a reference algorithm;

FIGS. 7B and 8 are examples code that may be used in connection with implementing optimizations in an embodiment in accordance with techniques herein.

DETAILED DESCRIPTION OF EMBODIMENT(S)

Figure 1:
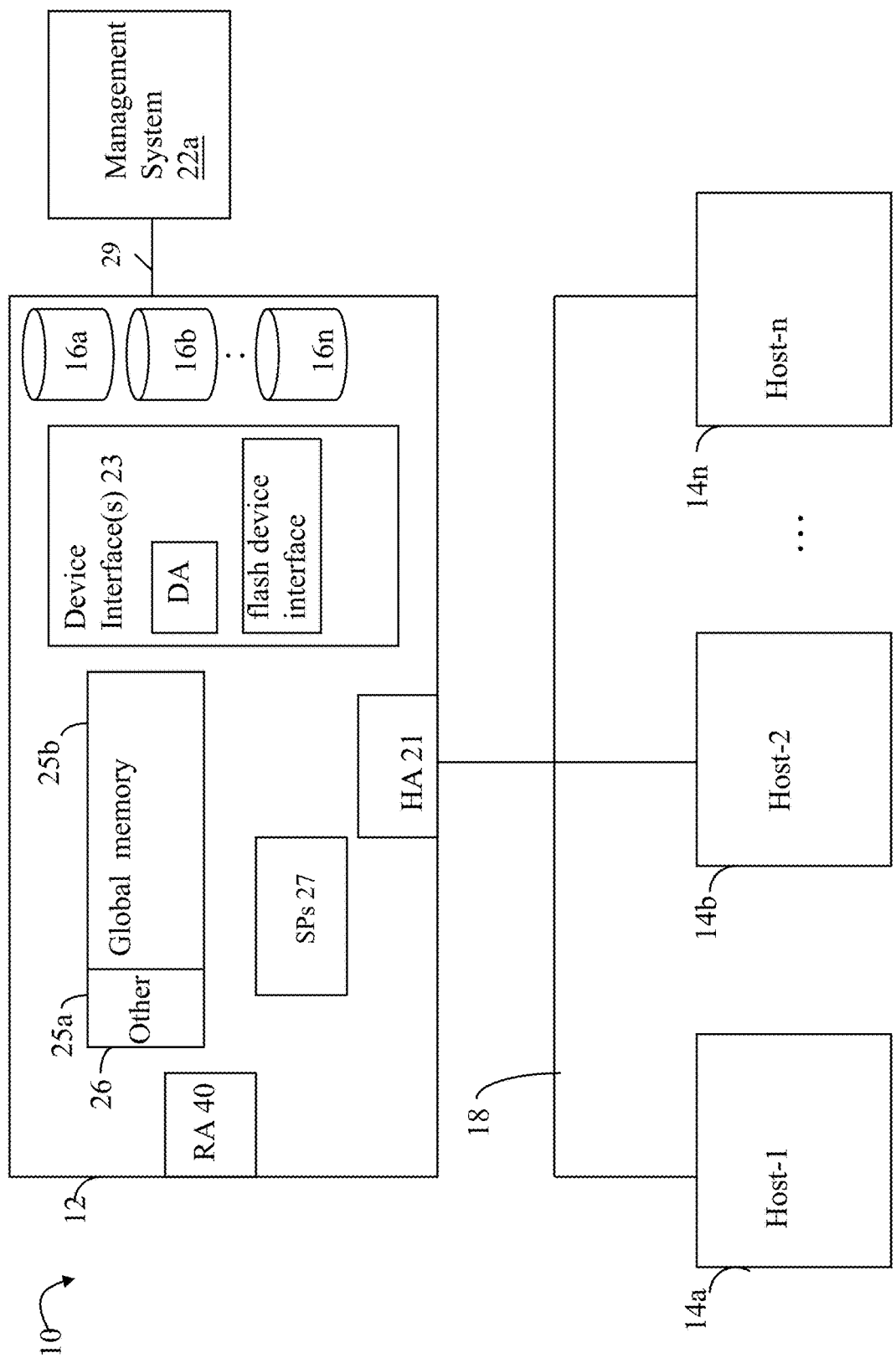
FIGS. 1 and 2B are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16*a*-16*n*. The data storage devices 16*a*-16*n* may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16*a*-16*n*. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25*b* may be used to facilitate data transfers and other communications between the device interfaces, HAs and/or RAs in a data storage array. In one embodiment, the device interfaces 23 may perform data operations using a system cache that may be included in the global memory 25*b*, for example, when communicating with other device interfaces and other components of the data storage array. The other portion 25*a* is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16*a*-16*n* of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system. that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2A:
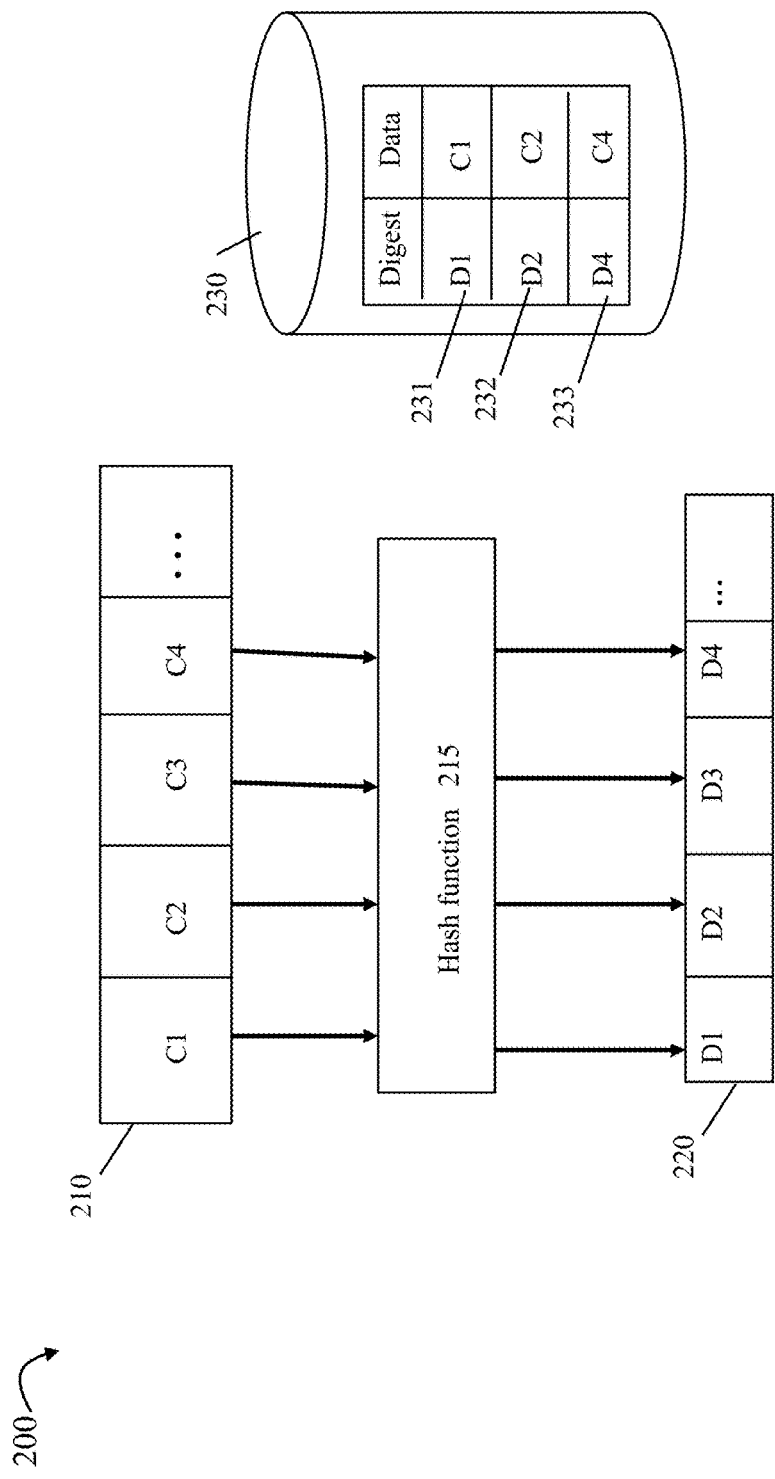
FIG. 2A is an example illustrating data deduplication as may be performed in an embodiment in accordance with techniques herein.

Referring to FIG. 2A, shown is an example 200 illustrating processing that may be performed in connection with data deduplication processing in an embodiment in accordance with techniques herein. Element 210 may denote the original data being written or stored on back-end non-volatile storage. The original data may be partitioned into multiple data chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic hashing function known in the art. For each chunk of 210, the hash function 215 may perform processing and generate, as an output, a hash value or digest. Element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

Element 230 of FIG. 2A may denote the data store used to store data chunks. In this example, as noted above, assume chunks C1 and C3 are the same with remaining chunks C2 and C4 being unique. In at least one embodiment, element 230 may be organized and managed using a data structure, such as a hash table. In at least one embodiment, computed digests may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data such as the file to its original form, the handle or reference into the hash table for chunk C3 may be used to obtain the actual C3 chunk of data from 230.

Figure 2B:
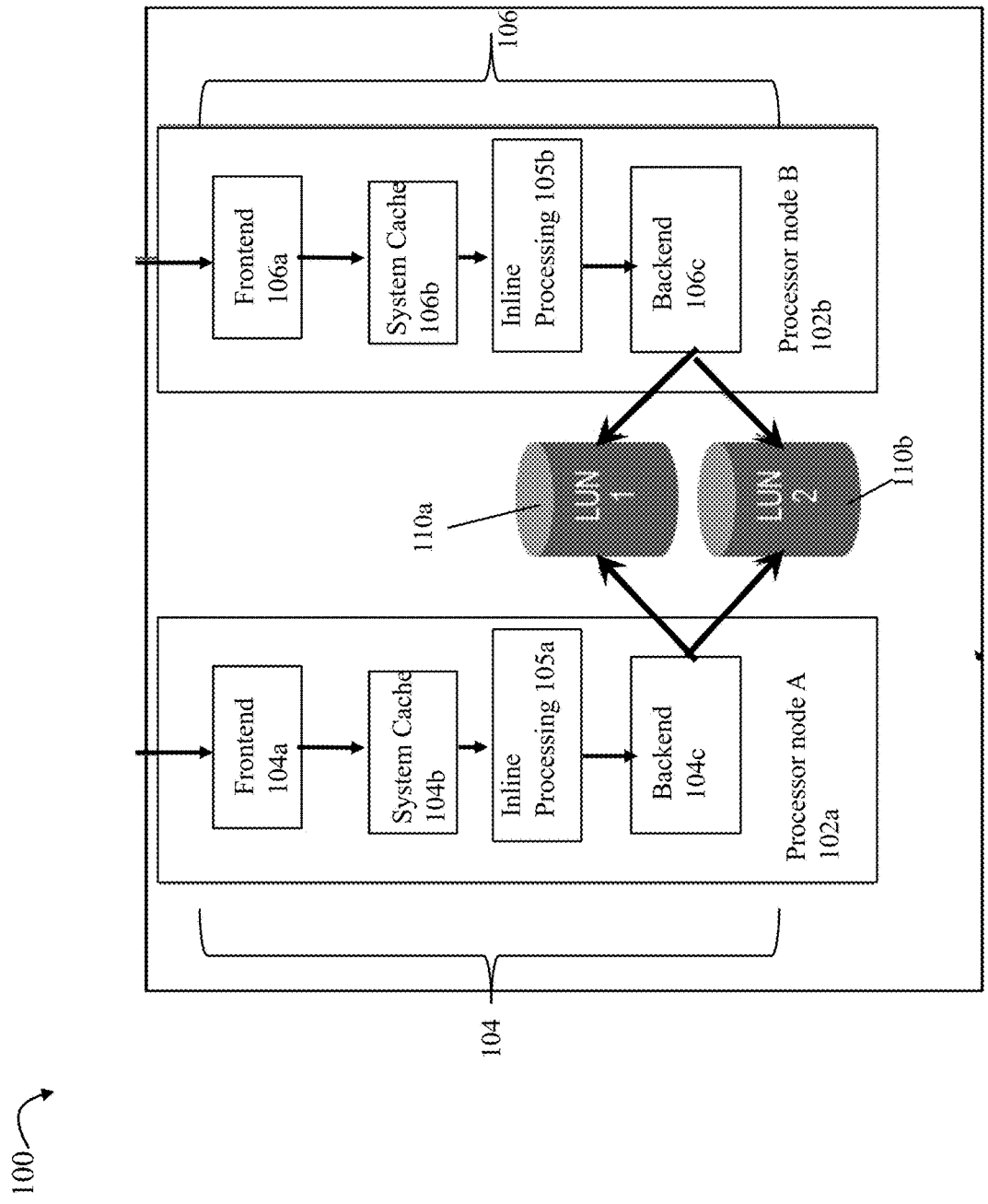

With reference to FIG. 2B, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b, inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b. In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in system cache, the read data chunk is retrieved from the system cache 104b and returned to the host. Otherwise, if the requested read data chunk is not in system cache 104b but is stored on physical storage 110a, 110b in its original form, the requested data chunk is read by the BE component 104c from the backend storage 110a, 110b, stored in the system cache and then returned to the host.

If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in system cache but stored on physical storage 110a, 110b, the compressed read data chunk may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. Processor cache is substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with inline processing 105a, 105b as noted above, data may be loaded from main memory and/or other lower cache levels into its CPU cache. In particular, inline compression (ILC) and inline data deduplication (ILD) may be performed as part of inline processing 105a, 105b. In at least one embodiment, the size of a data chunk processed by ILC and ILD may be 4096 bytes.

Compression processing such as performed by ILC threads is generally a CPU intensive operation. However, as discussed in more detail herein, there is a relationship between entropy and data compression where a computed entropy value for a data chunk may denote a measure or degree of compressibility of the data chunk. Generally, computation of an entropy value for a data chunk may be characterized as lightweight in terms of CPU requirements as opposed to performing compression processing for the data chunk. In an embodiment in accordance with techniques herein, the computed entropy value for a data chunk may be used in determining whether or not to proceed with compressing the data chunk. The foregoing is generally more CPU efficient than actually compressing each data chunk in order to determine whether or not it (the data chunk) is compressible (and should therefore be stored in its compressed form), or otherwise achieves at least a minimum amount of data reduction (e.g., whether or not a compressed form of a data chunk has a reduced size that is less than the size of the original data chunk by at least a threshold amount) to warrant storing the chunk in its compressed form.

Information entropy may be characterized as the average rate at which information is produced by a stochastic source of data. The definition of entropy used in information theory is analogous to the definition used in statistical thermodynamics. The concept of information entropy was introduced by Claude Shannon in "A Mathematical Theory of Communication", The Bell System Technical Journal (Volume: 27, Issue: 3, July 1948; pages 379-423). The measure of information entropy associated with each possible data value may be expressed as the negative logarithm of the probability mass function for the value. When the data source has a lower-probability value (i.e., when a low-probability event occurs), the event carries more "information" ("surprisal") than when the source data has a higher-probability value. The amount of information conveyed by each event defined in this way becomes a random variable whose expected value is the information entropy. Generally, entropy refers to disorder or non-uniformity. As a metric, an entropy value denotes a measure of the randomness of data, or a random distribution of symbols.

The relationship between entropy and compressibility is discussed, for example, in "Relationship Between Entropy and Test Data Compression", Kedarnath J. Balakrishnan and Nur A. Touba, IEEE Transactions on Computer-Aided Design of Integrated Circuits and Systems, Vol. 26, No. 2, February 2007, pages 386-395, and "Entropy and Compressibility of Symbol Sequences", Werner Ebeling, PhysComp96 (Physics and Computation 1996), Feb. 23, 1997, both of which are incorporated by reference herein. As explained in "Relationship between Entropy and Test Data Compression", entropy of a data set is a measure of the amount of information in the data set. Entropy calculations for fully specified data have been used to get a theoretical bound on how much the data can be compressed. In "Relationship between Entropy and Test Data Compression", the concept of entropy is extended for incompletely specified test data that has unspecified or don't care bits. "Entropy and Compressibility of Symbol Sequences" investigates long-range correlations in symbol sequences using methods of statistical physic and non-linear dynamics.

Entropy, H, with respect to a data set may be expressed as:

$$H = -\sum_{i=0}^{N-1} P_i \log_2(P_i) \quad \text{EQUATION 1}$$

Where
$P_i$ is the probability of occurrence of symbol $X_i$ in the data set;
N is the total number of unique symbols; and
$\log_2$ is the base 2 logarithm.

Generally, entropy for the data set depends on the symbol length L. Assume the data set is partitioned into sections where each section includes L bits of data. Thus L denotes number of bits in each section and L also denotes the length of the symbol. For a given symbol length, entropy for the data may be calculated to provide a value that denotes an expected or predicted level of compressibility for the data. Note that $P_i$, the probability of symbol $X_i$, refers to the actual frequency of the symbol X in the data set. Thus, $P_i$ for $X_i$ may be calculated as the frequency or number of times $X_i$ appears in the data set divided by the total number of sections in the data set.

It should be noted, although particular values are selected for purposes of illustration, generally the entropy value used with techniques herein may be included for any size data chunk or data set that may include symbols of any suitable number of bits (e.g., any symbol length) having any number of unique symbols.

In at least one embodiment in accordance with techniques herein, L may be 8 where each symbol may include 8 bits (e.g., have a symbol length of 8). In such an embodiment, each symbol or bit pattern of 8 bits denotes a byte of information having a numerical data value (base 10) in the range from 0 to 255, inclusively. In such an embodiment, N, the number of unique symbols (e.g., numerical value of bit patterns) is 256, and EQUATION 1 for calculating entropy, H, may be expressed as:

$$H = -\sum_{i=0}^{255} P_i \log_2(P_i) \quad \text{EQUATION 2}$$

The entropy values calculated using EQUATION 1 and EQUATION 2 are (e.g., real numbers) within the inclusive range of 0 to 8, where 0 denotes the maximum expected level of compressibility of the data set and 8 denotes the minimum expected level of compressibility of the data set. For a given data set, the larger the entropy value (e.g., closer to 8), the more random the data and the less compressible the data set; and the smaller or lower the entropy value (e.g., close to 0), the more uniform the data and the more compressible the data set.

In at least one embodiment, an entropy value may be determined for each 8 KB (kilobyte) chunk of a data set.

Thus, each 8 KB chunk includes 8192 bytes (e.g., 8*1024). Generally, the data set may be any defined set of stored data such as, for example, a database, one or more selected portions or logical address space portions of a database, data used by a particular application stored on one or more LUNs, selected portions of one or more LUNs, one or more files, one or more directories, one or more file systems, particular portions of one or more directories or file systems, and the like.

Figure 3:
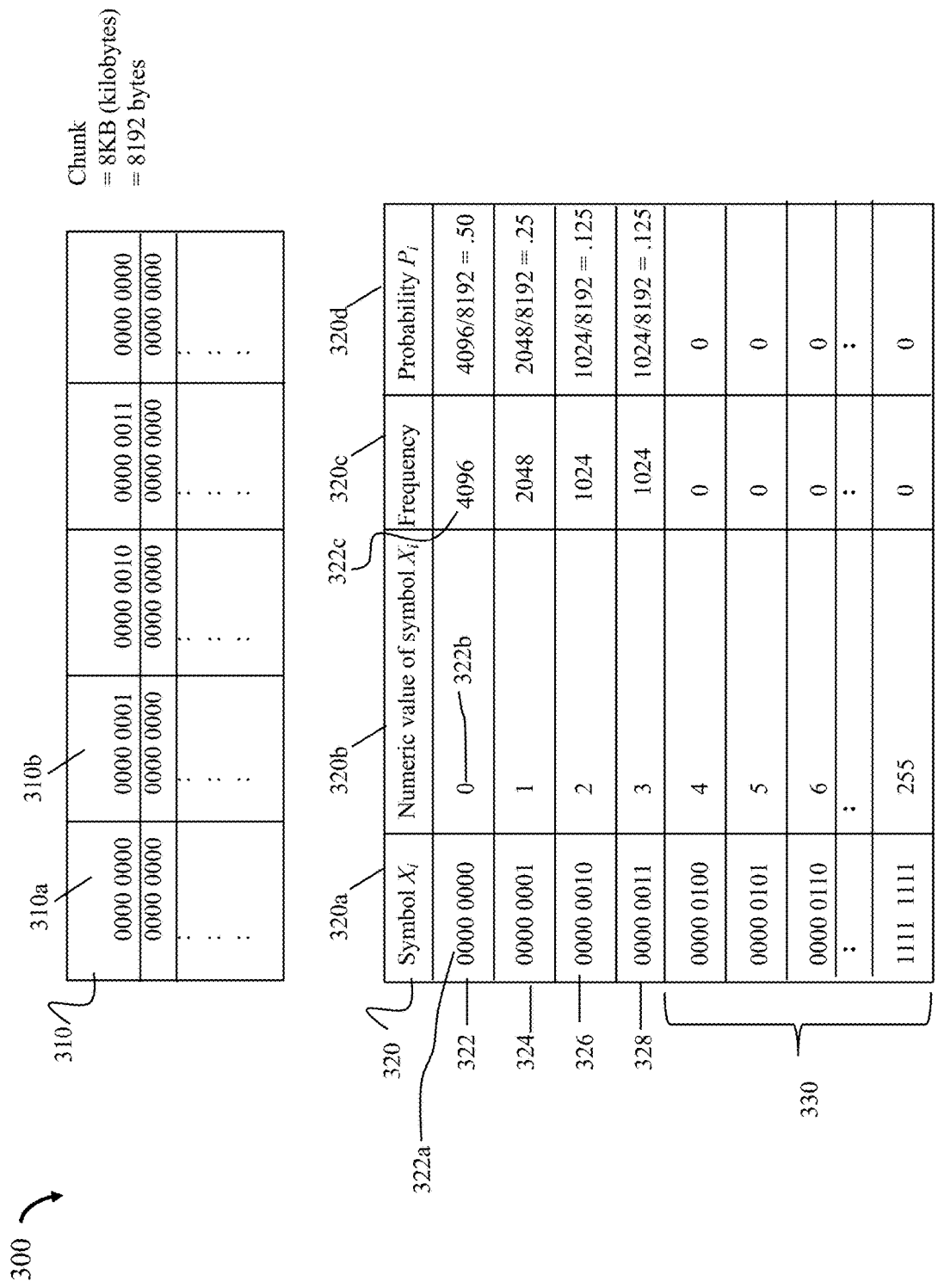
FIG. 3 is an example illustrating a data chunk and associated information that may be used in connection with calculating an entropy value for the data chunk an embodiment in accordance with techniques herein.

Referring to FIG. 3, shown is an example 300 illustrating a data chunk and associated information that may be used in an embodiment in accordance with techniques herein. The example 300 includes data chunk 310 having a size of 8 KB. The data chunk 310 may be partitioned into bytes or 8 bit segments where each byte denotes a symbol having a numeric value from 0 to 255, inclusively. For example, element 310a denotes a byte or symbol having a value of 0 and element 310b denotes a byte or symbol having a value of 1. To calculate the entropy for chunk 310, information in table 320 may be determined. Table 320 includes the following columns: symbol $X_i$ 320a, numeric value of symbol $X_i$ 320b, frequency of $X_i$ 320c and probability $P_i$. Each row of 320 includes a set of information for each unique symbol that can occur in the chunk. Thus, table 320 may include 256 rows, one row for each of the unique symbols having corresponding numeric values from 0 to 255, inclusively. Row 322 denotes that the numeric value 0 for symbol "0000 0000" has a frequency of 4096 and a probability $P_1$=0.50. Row 324 denotes that the numeric value 1 for symbol "0000 0001" has a frequency of 2048 and a probability $P_1$=0.25. Row 326 denotes that the numeric value 2 for symbol "0000 0010" has a frequency of 1024 and a probability $P_i$=0.125. Row 328 denotes that the numeric value 3 for symbol "0000 0011" has a frequency of 1024 and a probability $P_i$=0.125. Element 330 indicates that the remaining symbols each have a frequency=0 and thus a probability $P_i$=0. Based on EQUATION 2 and using the information from table 320 for the chunk 310, the calculated entropy value for chunk 310 is 1.75. Based on the range of possible entropy values from 0 to 8, inclusively, an embodiment may use the entropy value of 1.75 to determine whether or not to compress the chunk 310. For example, consistent with discussion herein, an embodiment may perform the entropy calculation for the chunk 310 inline as part of ILC processing of the I/O or data path, when writing or storing chunk 310 to PDs such as illustrated and described in connection with FIG. 2B. Based on the calculated entropy value for the chunk such as may be performed as part of ILC processing, an embodiment may determine whether to perform compression of the chunk inline as part of the I/O or data path.

In at least one embodiment, an entropy threshold may be specified where compression, such as part of MC, may be performed for chunks having an entropy value less than the threshold. Otherwise, the chunk may not be compressed, such as in connection with ILC processing. Thus, the threshold denotes a maximum allowable entropy level in order for ILC to compress the chunk. Generally, any suitable value for the threshold may be selected. For example, in at least one embodiment, the threshold may be a value within the range of 5.0 to 6.0, inclusively.

Figure 4:
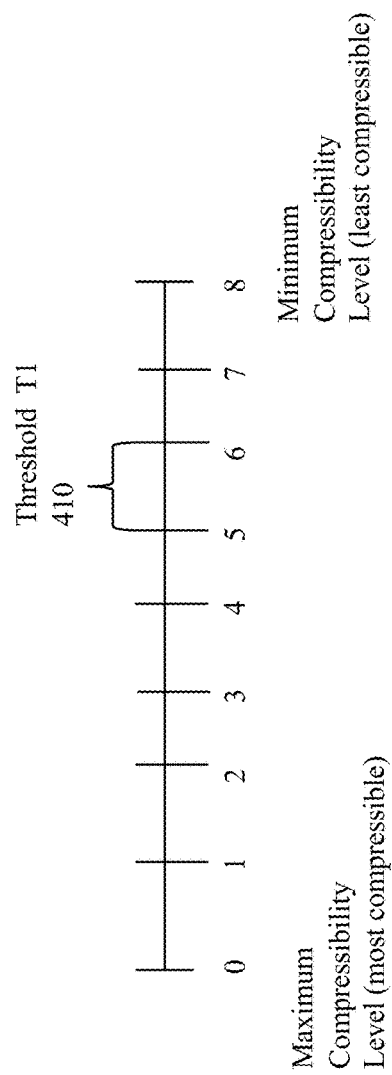
FIG. 4 is an example illustrating selection of an entropy threshold used in an embodiment in accordance with techniques herein.

Reference is made to FIG. 4 illustrating a threshold range within which a threshold for may be selected for use in an embodiment in accordance with techniques herein. The example 400 illustrates the possible range of entropy values from 0 to 8, inclusively where element 410 denotes that the entropy threshold T1 may be a value (e.g., real number) selected within the range of 5.0 to 6.0, inclusively. For example, assume T1 is selected as 6.0 whereby chunks have associated entropy values within the range 0 to 6.0, inclusively, are compressed. With reference to the example described above in connection with FIG. 3 for chunk 310 having an entropy value of 1.75, it may be determined to compress the chunk 310 inline (e.g., to perform compression processing of the chunk such as part of MC processing).

As noted above, compression processing such as performed by ILC threads is generally a CPU intensive operation. As also described above, since a computed entropy value for a data chunk may denote a measure or degree of compressibility of the data chunk, such an entropy value may be used in determining whether or not the chunk is compressible, or more generally whether the compressed form of the chunk is expected to achieve at least a minimum amount of data reduction to warrant storing the chunk in its compressed form and incurring additional costs associated with such (e.g., additional CPU processing to decompress the chunk when reading the chunk from physical storage where the compressed form of the chunk is stored). Thus, as discussed above, the entropy value for a data chunk may be used in determining whether or not to actually proceed with compressing the data chunk. In at least one embodiment, after a chunk is compressed based on its entropy value being below a specified entropy threshold, the size of the compressed form of the chunk may be compared to the size of the original or uncompressed form of the chunk (e.g., provided as an input to compression processing) to determine whether at least a threshold amount or rate of data reduction has been achieved.

In at least one embodiment, a determination of whether a chunk of a data set is compressible (and therefore stored in its compressed form) or uncompressible (and therefore stored in uncompressed form) may be made in connection with an entropy value determined for the chunk or the amount or rate of data size reduction achieved as a result of compressing the chunk (e.g., comparison of original chunk size to the resulting size of compressed form of the chunk generated as an output of actual compression of the chunk, such as based on a compression ratio). For example, a chunk may be determined as uncompressible if its associated entropy value is greater than a specified entropy threshold as discussed above. In this case, the chunk may be stored in its uncompressed original form. As another example, a chunk may be determined as uncompressible if the chunk's entropy value is below a specified minimum entropy threshold but the compressed form of the chunk does not result in at least a specified amount or rate of data reduction when the size of the compressed chunk is compared to the original uncompressed size of the chunk input to compression processing. Thus, in this latter example, the chunk is actually compressed a first time but a determination is made that the chunk is uncompressible since the output of compression processing does not generate a compressed form of the chunk which is at least a specified rate or amount smaller than the original chunk. For example, in at least one embodiment, a minimum threshold in terms of compression ratio such as a percentage, N % (N being a positive integer), may be specified denoting the compressed form of a chunk must result in at least an N % reduction in size of the original uncompressed form of the chunk in order for the chunk to be characterized compressible and in order for the chunk to be stored in its compressed form.

Figure 5:
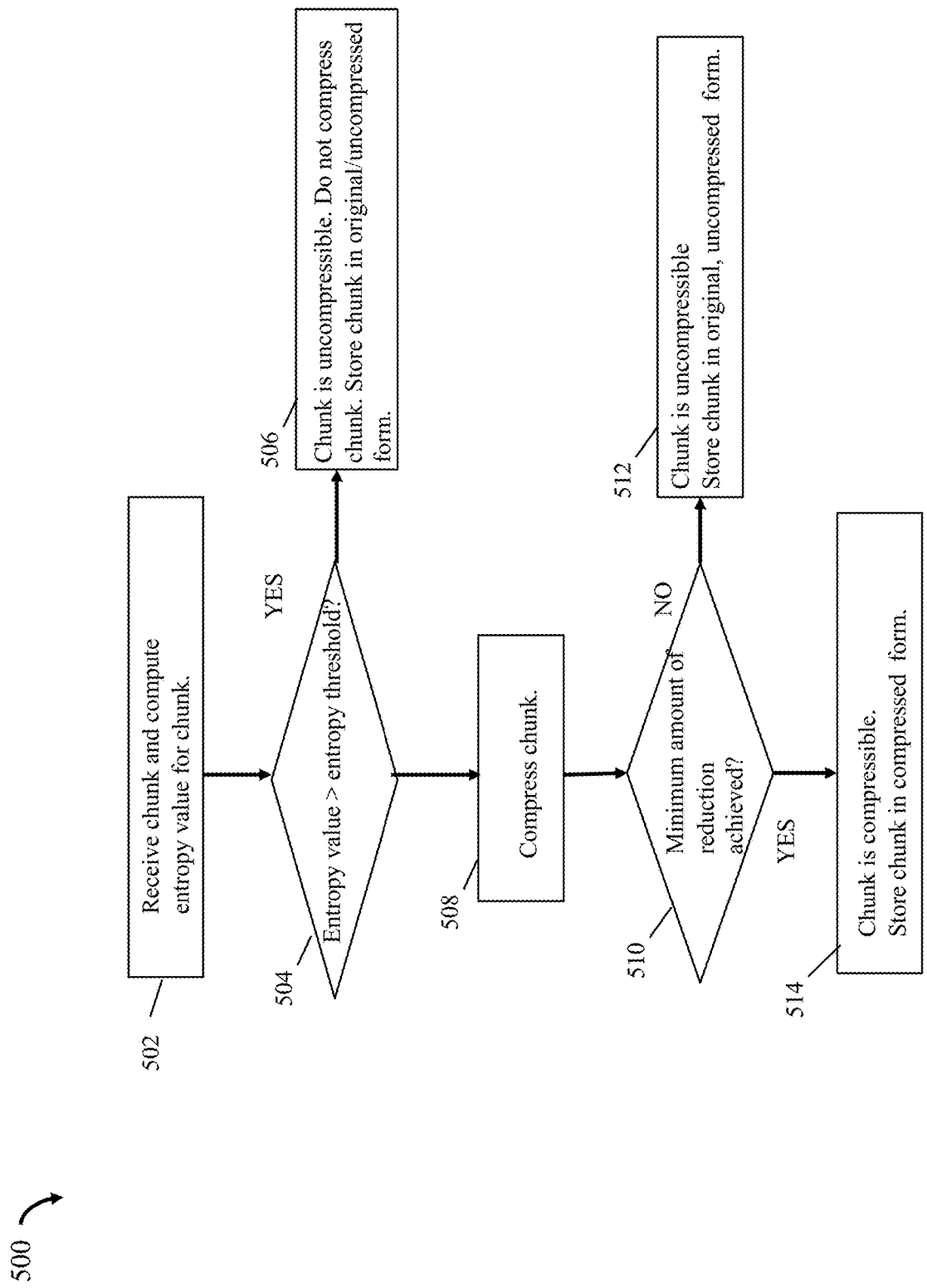
FIG. 5 is a flowchart of processing steps that may be performed in an embodiment in accordance with techniques herein.

Referring to FIG. 5, shown is a flowchart of processing steps that may be performed in an embodiment in accordance with techniques herein. The flowchart 500 summarizes processing discussed above that may be performed in an embodiment in accordance with techniques herein. At step 502, a chunk is received and the entropy value for the chunk may be computed. From step 502, processing proceeds to step 504 where a determination is made as to whether the entropy value for the chunk is greater than the specified entropy threshold. If step 504 evaluates to yes, control proceeds to step 506. In step 506, the chunk is determined to be uncompressible based on its entropy value. Accordingly, the chunk is not compressed and the chunk is stored in its original, uncompressed form. If step 504 evaluates to no, control proceeds to step 508 where the chunk is compressed. From step 508, control proceeds to step 510. At step 510, a determination may be made as to whether at least a minimum amount or rate of data reduction (e.g., size of original uncompressed chunk as compared to size of compressed chunk) is achieved by compressing the chunk. If step 510 evaluates to no, control proceeds to step 512 where the chunk is characterized as uncompressible and is stored in its original uncompressed form. Otherwise, if step 510 evaluates to yes, control proceeds to step 514 where the chunk is characterized as compressible and stored in its compressed form.

Consistent with other discussion herein, it should be noted that the processing of the flowchart of FIG. 5 may be performed as part of inline processing of the I/O or data path, such as ILC, or may alternatively be performed in connection with a data set offline (e.g., not as part of the I/O or data path when servicing received I/O operations, such as write operations), such as with respect to a data set after the chunks have been written to the data set. Additionally, in at least one embodiment, only compressed chunks may be deduplicated. In such an embodiment, entropy may be used to decide whether both compression and digest computation (as part of data deduplication processing) are performed.

The estimated compressed size of a data chunk X, may be determined using the chunk's entropy value as expressed using EQUATION 3 below:

$$\text{Estimated compressed size}(X) = (\text{Entropy}(X)/8) \cdot \text{number of bytes in } X \quad \text{EQUATION 3}$$

Where

X is the data chunk;

Entropy (X) is the computed entropy value for X, such as in accordance with EQUATION 2 and FIG. 3; and number of bytes in X is the number of bytes in the chunk X.

For example, with a 8 KB or 8192 byte chunk size and an entropy=6.0 for block 1, block 1's estimated compressed size is 6 KB resulting in a compression ratio of 4:3 (e.g., compression ratio=uncompressed size/compressed size). In such an embodiment using EQUATION 3, the entropy value may be used to determine the estimated compressed size of the chunk which is further used to determine an estimated or expected compression ratio denoting an estimated or expected rate of compression of the data chunk. In such an embodiment, the estimated compression ratio may be used to determine whether the data chunk is compressible or not (e.g., is expected to achieve at least a specified rate or amount of data reduction benefit as a result of compressing the chunk).

Described in following paragraphs are techniques that may be performed in an embodiment to accelerate and optimize computation of entropy values, such as based on EQUATIONS 1 and 2 herein. Following paragraphs may describe use of such techniques in connection with the particular application of entropy value computation for data chunks such as part of ILC processing. However, such techniques are more generally applicable for use with determining entropy values used in connection with offline data compression (e.g., not performed as part of the I/O path but rather on a static data set where I/Os are not begin issued to the data set). More generally, such techniques may be used in determining entropy values for any suitable purpose or application.

An embodiment in accordance with techniques herein may utilize any suitable instruction set and computer architecture available that may vary with the system and platform used for implementation. For example, an embodiment in accordance with techniques herein may be performed by executing code in a system using one or more CPUs and the x86 instruction set and architecture by Intel®. An embodiment may, for example, utilize the Advanced Vector Extensions (AVX) of the x86 instruction set architecture (ISA) for microprocessors from Intel®, such as Intel® Advanced Vector Extensions 2 (Intel® AVX2) or Intel® Advanced Vector Extensions 512 (Intel® AVX-512). Generally, AVX are extensions to the x86 architecture where, for example, the Intel® AVX2 instruction set operates on 256 bit wide registers and the Intel® AVX-512 instruction set operates on 512 bit wide registers. Generally, as known in the art, the AVX instructions are also characterized as single instruction multiple data (SIMD) instructions that provide for increased processor throughput by performing multiple computations in a single instruction. Techniques herein may utilize the extended register set available, such as in the Intel®AVX2 and Intel® AVX-512 instruction sets, where the number of available registers as well as extended larger size of each register allows for storing multiple counters in each such register. The particular number of counters packed into each register may vary with the maximum possible frequency of each counter (e.g., which determines the number of bits of each counter needed to represent the maximum possible frequency value of each counter). Following paragraphs may reference particular instruction sets, CPU register sizes (e.g., number of bits of each register), number of available registers, and counter sizes (e.g., number of bits in each counter value) to illustrate use of techniques herein. For example, an embodiment using the extended register set of an Intel AVX® architecture may use YMM registers, where each YMM register is 256 bits wide, or XMM registers, where each XMM register is 128 bits wide. As known in the art, XMM registers represent the lower 128 bits of the YMM registers. However, techniques here may generally be used with any suitable instruction set, number of registers, register size and counter size such as, for example, where multiple counters may be stored into a single register. For example, techniques herein may also be used in connection with a suitable RISC ISA, where a single register has a sufficient number of bits for storing multiple counters.

Prior to describing techniques herein, what will be described in connection with FIG. 6 is a reference algorithm of a pattern or instruction template that may be performed to compute entropy not using the optimizations described herein. This reference algorithm may be referenced in following paragraphs as a starting point to which the optimizations for entropy computation processing described in following paragraphs are applied. Generally, an embodiment may apply the optimizations as described herein in connection with other existing reference algorithms that may vary from the particular reference algorithm for entropy computation as described herein. Additionally, an embodiment in accordance with techniques herein may use any one or more of the optimizations described herein.

Referring to FIG. 6, shown is an example of a reference algorithm that may be used to compute an entropy value. The example 600 is written in a C-language style coding that describes one way in which an entropy value may be computed in a function. In the example 600, the function entropy_comp_size_est_ref computes the entropy value (e.g., such as based on EQUATIONS 1 and 2 and FIG. 3 herein) and then uses the entropy value to further compute and return the estimated compressed buffer size (e.g., based on EQUATION 3) rather than return the entropy value calculated.

Element 608 is a line of code defining the constant BYTE_VALUES as 256 denoting the number of counters or frequencies. The example 600 describes a reference algorithm that uses an array or histogram of 256 counters or frequencies as described with reference to FIG. 3. Thus, BYTE_VALUES of 608 denotes the number of counters or frequencies as in column 320c of FIG. 3.

Element 610 identifies the function name, entropy_comp_size_est_ref, that returns an integer value and has input parameters buf and len. Buf is the input buffer that is character array including the characters of the chunk for which the entropy computation processing is being performed. Len is an integer identifying the size of the input buffer, buf, in bytes.

Element 620 includes the local function variables. In particular, 621 defines the variable hist (histogram) as an array having 256 elements. Each array cell or element of hist denotes a corresponding one of the counters or frequencies of 320c of FIG. 3 (e.g., hist[0] corresponds to the counter or frequency 322c). Element 630 is a for loop that computes the byte frequencies for the chunk by traversing the input buffer, buf, and incrementing the appropriate counter or frequency in the histogram, hist. Element 640 denotes the code that processes the histogram, hist, and computes the entropy value for the chunk (e.g., where the chunk is stored in the input buffer, buf) using the byte frequencies computed in 630. Element 640 computes the entropy value based on EQUATION 2. Line 642 is a line of code that computes Pi of EQUATION 2 and assigns the result to f_freq. Line 644 is a line of code that computes the final entropy value. In line 644, "log 2 (f_freq)" corresponds to "$\log_2$ (Pi)" of EQUATION 2. Element 650 denotes code that converts the computed entropy value (as determined in 640) into a compressed size estimate (e.g., such as based on EQUATION 3).

In this example, the counters or frequencies as stored in the array, hist, (e.g., defined in line 621) may each have a maximum possible value able to accommodate up to 64 KB size chunks. In the extreme case, where each byte of the 64 KB size chunk is identical, a single counter has a maximum value equal to the number of bytes in the chunk. As such, the example 600 illustrates a particular reference algorithm with line 621 where each counter or frequency hist[i] (e.g., "i" being a integer in the inclusive range of 0 through 255) is an unsigned short able to represent such a maximum possible value for a maximum possible chunk size of 64 KB. It should be noted that in although the reference algorithm is able to represent maximum possible counter values based on such a maximum possible chunk size of 64 KB, examples in following paragraphs illustrating use of the optimization techniques may be described with reference to a different chunk size, such as 4 KB or 8 KB (e.g., as described in connection with FIG. 3).

What will now be described is an embodiment in accordance with techniques herein. In this embodiment, reference is made back again to the example of FIG. 3 where an entropy value is determined for each chunk of data having a chunk size of 8 KB or 8192 bytes. Each data item in the chunk is a byte or 8 bits. Thus, in table 320, columns 320a and 320b denote, respectively, the 256 possible symbols and numeric values for each byte of the chunk that is processed. As described herein, to determine the entropy value for the chunk 310, each byte of the chunk 310 may be read or input, mapped to a particular matching symbol entry (e.g., matching an entry of 320a and 320b) of the table 320, and then the counter of the corresponding matching symbol entry (e.g., frequency counter in 320c) may be incremented for the byte just read or input. Generally, the size or number of bits of each counter is capable of storing a numeric value denoting the maximum possible count or frequency that a symbol or data item may occur in a single chunk. For example, in this case where there are 8192 bytes in the chunk, each counter needs to have at least a sufficient number of bits able to represent the maximum possible counter value of 8192 (e.g., in the worst case, each byte of the 8192 chunk may be identical and may be any one of the possible 256 symbols 320a or values 320b). Thus, in one aspect, without any apriori or historical information about a particular data set, or chunks thereof, processed, the occurrence of any particular one of the 256 possible data items, such as byte-based symbols 320a or associated values 320b, may be characterized as random or pseudo-random in nature.

An embodiment in accordance with techniques herein may use optimizations that will now be described to accelerate entropy computations such as those that may be performed as described in connection with FIG. 6. Generally, the optimizations include determining and using a table of precomputed values for binary logarithmic values or base 2 logarithm values as used in connection with computing each entropy value for a chunk. As known in the art, the binary or base 2 logarithm of a number N may be represented as $\log_2$ N, such as in EQUATION 2, which is the power to which the number 2 must be raised to obtain the value N. In EQUATION 2, the binary logarithm is determined for Pi (e.g., $\log_2$ (Pi)). The optimization includes storing in the table precomputed $\log_2$ values for the entire anticipated or allowable byte frequency range denoting the maximum possible counter or frequency value such as based on the chunk size. As discussed elsewhere herein, using a chunk of 8K or 8192 bytes, the maximum value for a counter or frequency may be 8192 (e.g., if all bytes of a single chunk are identical). Further discussion below provides details about one embodiment using the table of precomputed values which further includes additional optimizations and simplifications where, rather than store precomputed binary logarithmic values for possible or allowable values of Pi, the table may store precomputed binary logarithmic values for all possible or allowable counter or frequency values, from 0 through 8192, inclusively, in this example (e.g., wherein 8192 is the number of bytes or symbols in each chunk and also wherein 8192 denotes the maximum possible value of any frequency or counter value).

The reference algorithm of FIG. 6 involves first building the byte value frequencies histogram in 630 and then in the loop of 640, at line 644 computing up to 256 (base 2 or binary) logarithms (e.g., using the "log 2" function of 644). Furthermore such processing in the loop 640 at lines 642 and 644 are floating point operations which are generally more computationally expensive than performing integer operations. The optimization using the precomputed binary logarithmic values provides for optimizing such computations at line 644 of the reference algorithm by using a table of precomputed $\log_2$ values where, at runtime, a lookup in the table may be performed to obtain the desired precomputed $\log_2$ value rather than compute the $\log_2$ value at runtime while performing the entropy computation processing such as at line 644. Additionally, as will become apparent based on discussion in following paragraphs and in connection with other optimizations, techniques herein may utilize logarithmic identities which transform terms of the entropy computation of EQUATION 2 into other mathematical equivalents. In an embodiment in which the chunk size is 8192 bytes, Pi as in EQUATION 2 for a frequency "f" may be represented as f/8192. The term "$\log_2$ (Pi)" for a frequency "f" as in EQUATION 2 may be expressed equivalently as:

$$\log_2(Pi) = \log_2(f/8192) \qquad \text{EQUATION 4}$$

Using a mathematical logarithmic identity, "log (n/k)" is equivalent to "log (n)–log (k)" where the above EQUATION 4 is now equivalently expressed as:

$$\log_2(Pi) = \log_2(f) - \log_2(8192) \qquad \text{EQUATION 5}$$

Further, since the entire quantity summed (e.g., via the summation symbol) is negated in EQUATION 2, EQUATION 5 can be negated and equivalently becomes:

$$\log_2(Pi) = -(\log_2(f) - \log_2(8192)) \qquad \text{EQUATION 6A}$$

Using another logarithmic identity, "–(log(n)–log (k)" is equivalent to "log(k)–log(n)" where EQUATION 6A may now be equivalently expressed as:

$$\log_2(Pi) = (\log_2(8192) - \log_2(f)) \qquad \text{EQUATION 6B}$$

Thus, based on such transformations and equivalents for logarithmic identities, EQUATION 2 for computing an entropy value, H, may be equivalently expressed as:

$$H = \sum_{i=0}^{255} \left(\frac{i}{NUM}\right) * (\log_2(NUM) - \log_2(hist[i])) \qquad \text{EQUATION 7}$$

where
NUM is the number of bytes in the chunk (e.g., 8192 in this example since chunk is 8 KB or 8192 bytes);
hist is an array of the counters or frequencies (e.g., 256 counters in this example); and
hist[i] is the $i^{th}$ counter or frequency for the byte pattern having a numeric value "i".

Based on EQUATION 7, an embodiment may compute the entropy value using precomputed binary logarithm values which have a range from 0 to 8192, inclusively. In this example using 8BK or 8192 byte chunks, NUM and also hist[i] (denoting a counter or frequency) has a maximum possible value of 8192 whereby the range of possible binary logarithmic values that may be used are in the inclusive range from 0 to 8192. Thus, the table of precomputed binary logarithmic values may include such precomputed values for all integers in the range 0 to 8192, inclusively. Additionally, to further accelerate entropy computations performed at runtime, rather than use logarithmic values that are real decimal values, the precomputed logarithmic values may be high-precision integer values (e.g., converted equivalent integer values rather than the real decimal value representation of logarithmic values). In this manner, subsequent entropy computations done at runtime using values from the table may be performed using integer values/integer arithmetic operations rather than performing floating point arithmetic operations.

Techniques herein may employ a suitable precision factor used to convert a floating point binary logarithmic value to an equivalent integer value stored in the table. For example, a floating point value of 11.123 may be represented using an integer value of 11,123 having an implied precision factor of 1000 denoting an implied shift in the decimal place to the left by 3 decimal places. Put another way, the integer value divided by the implied precision factor is an equivalent representation of the original floating point value of 11.123. The precision factor may be selected to preserve a desired level of precision. For example, a floating point value of 11.12345 may be represented using an integer value of 11,123 having an implied precision factor of 1000 denoting an implied shift in the decimal place to the left by 3 decimal places. However, using a precision factor of 1000 only preserves 3 decimal places to the thousandths of the floating point number represented by the integer value 11, 123. If additional precision preservation is desired, a larger precision factor such as 10,000 or 100,000 may be used. For example, using a precision factor of 10,000 results in an integer value of 11,1234 used to represent 11.12345; and using a precision factor of 100,000 results in an integer value of 11,12345. Thus, an embodiment in accordance with techniques herein may select any suitable precision factor, also referred to as a precision multiplication factor. For example, in at least one embodiment as described herein the precision factor or precision multiplication factor may be selected to match the precision of the original reference algorithm's floating point calculations.

Figure 7A:
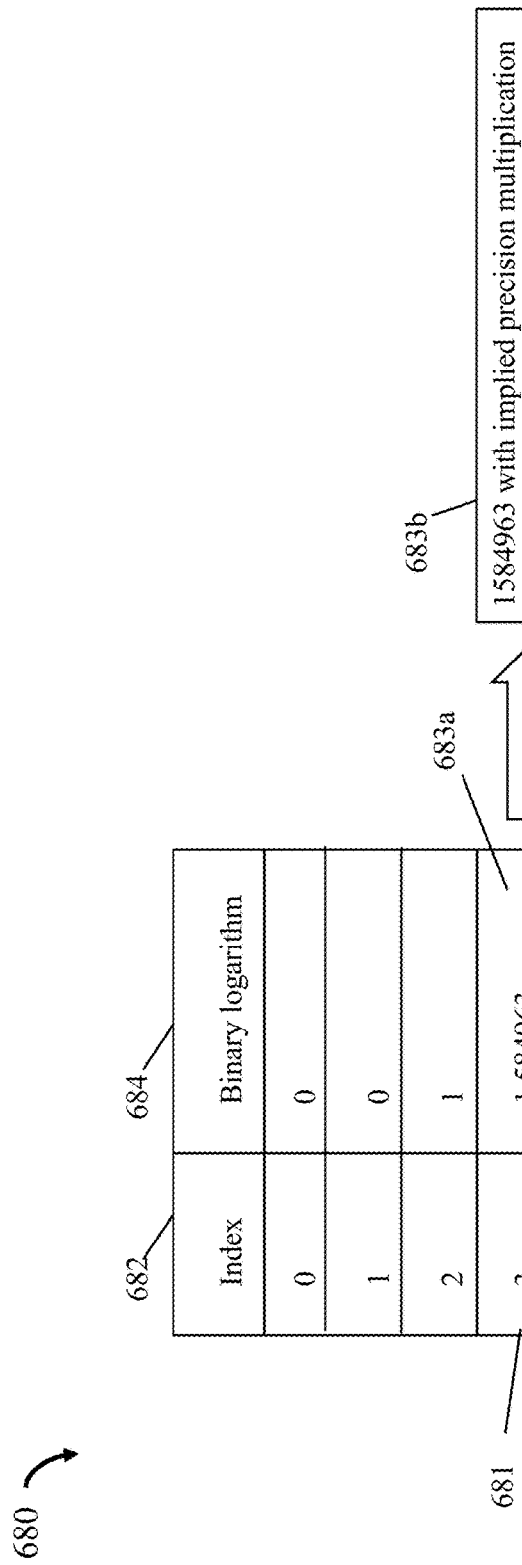
FIG. 7A is an example of a table of precomputed logarithmic values that may be used in an embodiment in accordance with techniques herein.

Referring to FIG. 7A, shown is an example of the table of precomputed binary logarithms that may be determined and used in an embodiment in accordance with techniques herein. The table 680 includes precomputed values for this particular example based on a maximum frequency or counter value of 8192. Other embodiments having a different size chunk has an associated maximum frequency or counter value based on such chunk size whereby the table used in such an embodiment includes all counter values in the range up to, and including the associated maximum frequency or counter value. The table 680 includes a first column 682 of index values and a second column 684 of precomputed based 2 logarithmic values. A row of the table includes a binary or base 2 logarithmic value in column 684 for the particular input value in column 682 of the same row. For example, row 681 indicates that the binary log of 3 is 1.584963. However, as described above, the values in the table 680 may be stored as integer equivalents with an implied precision multiplication factor. For example, rather than include 1.584963 as entry 683a, an embodiment may store the integer value 1584963 (683b) with implied precision multiplication factor of a million, 1,000,000. Similarly, other values in column 684 may be integer values having an implied precision multiplication factor used to represent real or floating point numbers. As described elsewhere herein, in at least one embodiment, a precision multiplication factor of 10,000,000 may be used (e.g., defined as the constant L2_PRECISION as in FIGS. 7B and 8 discussed below).

Referring to FIG. 7B, shown is an example of code that may be used to determine the table 680 of precomputed binary logarithms that may be used in an embodiment in accordance with techniques herein. The example 700 is written in a C-language style coding that describes one way in which the binary logarithm values may be computed and stored in the table for later subsequent use at runtime, such as part of ILC processing, when computing entropy values. The code of the example 700 may be generally executed as some point in time prior to performing entropy computation to initialize the table with the desired precomputed values. At a later point in time, the runtime performance of the entropy computation code may look up desired values in the table and used thereby omitting computation of the binary logarithmic values at runtime during execution of the entropy computation code (e.g., use precomputed value from table rather than compute the value at runtime during entropy computation as in line 644 of FIG. 6 with log 2 function).

Element 710 denotes constants defined. Line 711 defines the constant BYTE_VALUES to be 256, similar to line 608 of FIG. 6. Line 712 defines the constant value used in this example as the precision multiplication factor to preserve the accuracy of floating point or real values represented by the integer precomputed binary logarithms in column 684 of the table 680. In this example line 712 defines a constant L2_PRECISION that is an unsigned long long (denoted by the LLU) data type. As known in the art, "long long" data type may identify an extended size long integer having a size or width of 64 bits. Element 720 defines the table, 12_8k_table, used in store the binary logarithmic values calculated in subsequent processing of the example 700.

Element 740 is code of a function, init_12_8k_table, that initializes the table, table 12_8k_table, with the binary logarithms. Code of function init_12_8k_table 740 computes the binary logarithms and stores the binary algorithms in their integer representation in the table 12_8k_table. In particular, line 742 included in the for loop 742a computes the base 2 logarithm of the loop control variable "i" and stores its integer representation with the applied precision multiplication factor, L2 PRECISION. It should be noted that line 741 initializes the base 2 logarithm of 0 to be 0. The foregoing of line 741 is a simple workaround or substitution since the base 2 logarithm of 0 is defined mathematically as negative infinity. Storing a value of 0 by line 741 is used to avoid any mathematical errors due to the foregoing mathematical definition of negative infinity. Line 742 computes the desired base 2 logarithmic value of "i" (using the log 2f function) and stores the result in a corresponding entry "i" of the table 12_8k_table[i]. Other code computing the entropy value discussed elsewhere herein may use the table 12_8k_table to obtain a precomputed base 2 logarithmic value for an integer "i" by accessing the $i^{th}$ element of the table.

The reference algorithm as implemented with the code of FIG. 6 computes the entropy value by traversing through each data chunk, as may be stored in an 8 KB buffer, byte by byte, and counts the number of times each byte value appears in the buffer. This is where a majority of computation time is spent at runtime when executing the reference algorithm of the entropy computation routine of FIG. 6. As another optimization, an embodiment in accordance with techniques herein may replace a single histogram-building loop (e.g., 640) with two loops, an outer loop and an "unrolled" inner loop. As will be described below in connection with FIG. 8, the outer loop may fetch multiple bytes, N, of the buffer and store them into a single register, and the inner, unrolled loop extracts each byte from the register (rather than from memory each time) and increments the corresponding counter for the extracted byte. Depending on ISA, platform support, compiler version support and other factors that may vary with embodiment, a register may be utilized that is capable of storing a large number of bytes from the buffer into a single register. For example, in at least one embodiment using the Intel AVX architecture and ISA, an XMM or YMM register may be used where the YMM register is 256 bits wide and the XMM register is 128 bits wide. In connection with the example of FIG. 8, assume that an XMM register is used which is 128 bit wide and that the outer loop fetches from the buffer and stores in the XMM register 16 bytes at a time where the 16 bytes are then further processed by the second unrolled inner loop. The following example of FIG. 8 is an implementation optimized for an 8 KB 10 buffer holding the data for a single 8 KB data chunk for which the entropy value is computed.

Referring to FIG. 8, shown is an example 800 of code that may be used to compute an entropy value for a data chunk in an embodiment in accordance with techniques herein. The example 800 is written in a C-language style coding that describes one way in which the entropy value may be computed using techniques herein, such as part of ILC processing, when computing entropy values.

Line 810 indicates that the function, entropy_comp_size_est_xmm_8k, computes the entropy value returned as an integer value of the function based on the input parameter, buf, which includes the bytes of the data chunk. Element 820 defines the local function variables. Line 822 defines the variable hist including the histogram of frequencies or counters. Generally, hist in this example is an array similar that as described in connection with FIG. 6 that includes an entry for each counter (e.g., hist includes the counters as described in connection with column 320c of FIG. 3). Line 824 defines a 16 byte buffer. Line 826 defines and initializes the entropy variable that will, at the end of processing, hold the computed entropy value. Line 828 define local integer processing variables.

Element 830 includes code that computes the byte value frequency histogram counting the number of times each of the possible 256 byte patterns appears in the chunk stored in buf, the input buffer. Element 831 denotes the outer loop that, for each iteration loads (via instruction/code in line 832) the next 16 bytes of the input buffer, buf, into an XMM 128 bit wide register. Element 835 denotes the unrolled inner loop that processes each of the 16 bytes in the XMM register just loaded via line 832 for the current iteration of the outer loop. For example, line 834 includes code that first extracts byte 0 from the XMM register and assigns the extracted byte 0's numeric integer value to "x" (e.g., x=_mm_extract_epi8 (t,0)), and then increments the appropriate counter of the histogram (e.g., hist[x]++). In a similar manner, element 835 further includes a lines of code to process the remaining 15 bytes of the XMM register. For example, line 836 includes code that extracts the last byte 15 from the XMM register and assigns the extracted byte 15's numeric integer value to "x" (e.g., x=mm_extract_epi8(t,15)), and then increments the appropriate counter of the histogram (e.g., hist[x]++). As known the art, a loop may be characterized as unrolled as in 835 where rather than include a for loop with a loop control variable, the loop is unrolled and each iteration is rather included or coded inline in the routine body as in 835.

Element 840 includes code, in the form of a for loop, that processes the histogram of counters to compute the entropy value. Element 840 iterates through each counter of the histogram where each counter is denoted by a single array element hist[i]. In line 842, the portion "(L2_8K−12_8k_table[h])" is computing the value of "log 2 (Pi)" as in EQUATION 2 based on hist[i]. As described above such as in EQUATION 7, "log 2 (Pi)" of EQUATION 2 may be equivalently expressed as "(log 2 (NUM)−$log_2$ (hist[i]))" as in EQUATION 7, where "$log_2$ (NUM)" is "$log_2$ (8192)" and is denoted by the constant "L2_8K" in line 842 of the code. The term "$log_2$ (hist[i]))" of EQUATION 7 is denoted by "12_8k tabl[h]" in line 842 of the code that references the table of precomputed binary logarithmic values to obtain the base 2 logarithm for the current counter value, h.

The term "Pi" from EQUATION 2 is expressed in EQUATION 7, as $$\left(\frac{i}{NUM}\right),$$

which is partially expressed in line 842 and also in the return statement at line 850. In line 842, "(unsigned long long) h" references the current counter value hist[i], which corresponds to the numerator "i" from the term $$\left(\frac{i}{NUM}\right)$$

of FIG. 7. The denominator of the foregoing term $$\left(\frac{i}{NUM}\right)$$

in this implementation is further extracted and moved outside of the loop 840 as a further optimization and handled in an equivalent manner in connection with line 850.

Referring back to FIG. 6, the code of 650 in the reference algorithm includes a return statement that converts the entropy value, f_entropy, into a compressed size estimate (e.g., in number of bytes) as in "(f_entropy*f_len/8)". Line 850 of FIG. 8 further combines the equivalent integer based type calculation of the foregoing of 650 with the above-noted denominator, "1/NUM" (e.g., from Pi term) as a further optimization. In other words, without considering the denominator "1/NUM", which is 1/8192 in this example, the return statement of line 850 would return the int value for "(entropy/L2_PRECISION/8)*NUM". Now combining this with the denominator of "1/NUM" or 1/8192 results the existing return statement of line 850 where the two occurrences of NUM cancel each other out.

It should be noted that the inventors have implemented the above-noted optimizations all in combination in their particular embodiment and observed that including such optimizations as described in connection with FIGS. 7A, 7B and 8 result in about 30-40% savings in runtime as compared to an implementation such as the reference algorithm of FIG. 6 in which the optimizations are not included.

In at least one embodiment in accordance with techniques as described above, the foregoing optimizations may be performed with respect to every data chunk and also every byte of every data chunk. As a variation to further accelerate entropy computation of data chunks of a data set, an embodiment may perform processing as described herein for a subset or selected portion of less than all the data chunks of the data set. For example, an embodiment may perform processing as described herein for every 3 out of 4 data chunks, every 1 out of 4 data chunks, and the like, of a data set. The particular data chunks of a data set that are selected may also, more generally, be selecting using any suitable technique or heuristic. As yet a further variation, when determining a single entropy value for a single chunk, an embodiment in accordance with techniques herein may perform processing on a subset or selected portion of less than all bytes of the single data chunk. For example, an embodiment in accordance with techniques herein may perform processing as described in connection with FIG. 8 for the data chunk (as stored in the input buffer, buf) with the modification that only a subset or selected portion of the bytes in the input buffer are used in computing the entropy value for the data chunk. For example, an embodiment may skip 3 out of every 4 bytes of the input buffer thereby further reducing entropy computation costs for a single chunk by about a factor of 4. In such an embodiment, the frequency denoting the total number of data items processed (e.g., denominator of each fraction used in computing the probabilities Pi as in column 320d of FIG. 3) may be modified accordingly to denote the actual total number of bytes processed rather than the total number of bytes in the data chunk (e.g., 4096). For example, if skipping 3 out of 4 bytes in a 4096 byte data chunk as noted above, the revised frequency is ¼ of 4096=1024.

The techniques herein may be implemented using any suitable hardware and/or software, such as executing code using a processor where the code is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. The processor may be any suitable processor such as, for example, a processor of a computer, data storage system, or other component, such as an ASIC (application specified integrated circuit).

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of data processing comprising:
receiving a data chunk partitioned into N data items;
performing first processing that computes an entropy value for the data chunk, wherein the first processing includes:
determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and
performing second processing using the plurality of counters to determine an entropy value for the data chunk, wherein said second processing includes selecting a precomputed binary logarithmic value from a table for each of the plurality of counters; and
determining, in accordance with the entropy value for the data chunk, whether the data chunk is compressible; and
responsive to determining the data chunk is compressible based on the entropy value for the chunk, compressing the data chunk, wherein a range is defined from a minimum value of zero and a maximum value of N, wherein N denotes a number of data items in the data chunk, and wherein the table includes precomputed binary logarithmic values for each value in the range.

2. The method of claim 1, responsive to determining the data chunk is not compressible, storing the data chunk in its uncompressed form.

3. The method of claim 1, wherein compressing the data chunk produces a compressed form of the data chunk and, after compressing the data chunk, other processing is performed that includes:

determining whether the compressed form of the data chunk achieves at least a minimum amount of data reduction; and responsive to determining the data chunk does not achieve at least the minimum amount of data reduction, storing the data chunk in its uncompressed form.

4. The method of claim 3, further comprising:

responsive to determining the data chunk does achieve at least the minimum amount of data reduction, storing the data chunk in its compressed form.

5. The method of claim 1, wherein determining, in accordance with the entropy value for the data chunk, whether the data chunk is compressible further comprises:

determining whether the entropy value for the data chunk is less than an entropy threshold; and if the entropy value for the data chunk is less than the entropy threshold, determining that the data chunk is compressible and otherwise determining that the data chunk is not compressible.

6. The method of claim 1, wherein the entropy value for the data chunk is determined inline as part of I/O path processing for the data chunk.

7. The method of claim 1, wherein the method is performed inline as part of I/O path processing for the data chunk.

8. The method of claim 1, wherein the method is not performed inline as part of I/O path processing for the data chunk.

9. The method of claim 1, wherein each of the N data items of the data chunk corresponds to a byte of data in the data chunk.

10. A method of data processing comprising:

receiving a data chunk including a plurality of data items;

performing first processing that computes an entropy value for the data chunk, wherein the first processing includes:

determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and performing second processing using the plurality of counters to determine an entropy value for the data chunk, wherein said second processing includes selecting a precomputed binary logarithmic value from a table for each of the plurality of counters; and determining, in accordance with the entropy value for the data chunk, whether the data chunk is compressible; and responsive to determining the data chunk is compressible based on the entropy value for the chunk, compressing the data chunk, wherein the data chunk has a size that is a number of bytes, N, a range is defined from a minimum value of zero and a maximum value of N, and wherein the table includes precomputed binary logarithmic values for each value in the range.

11. The method of claim 10, wherein each precomputed binary logarithmic value in the table is stored as an integer denoting an integer representation of said each precomputed binary logarithmic value in accordance with a specified precision multiplication factor.

12. The method of claim 11, wherein said each precomputed binary logarithmic value is determined by dividing the integer representation of said each precomputed binary logarithmic value as stored in the table by the specified precision multiplication factor.

13. The method of claim 12, wherein the plurality of data items of the chunk are stored in a buffer, and wherein determining a plurality counters for data items occurring in the data chunk includes:

storing multiple data items from the buffer into a single register; and extracting each of the multiple data items from the single register and incrementing a corresponding one of the plurality of counters associated with said each data item.

14. The method of claim 13, wherein performing second processing using the plurality of counters to determine an entropy value for the data chunk includes:

for each of the plurality of counters, computing a first value that is a mathematical difference of a first binary logarithm of N and a second binary logarithm that is the precomputed binary logarithmic value selected from the table for said each counter.

15. The method of claim 14, wherein performing second processing using the plurality of counters to determine an entropy value for the data chunk further includes:

for each of the plurality of counters, determining a second value for said each counter that is a mathematical product of the first value computed for said each counter and a frequency value denoted by said each counter.

16. The method of claim 15, wherein the method includes:

determining a third value as a result of a mathematical division operation of a sum of the second values determined for the plurality of counters divided by the specified precision multiplication factor; and calculating the entropy value for the data chunk as a result of a mathematical division operation of the third value divided by N.

17. The method of claim 16, further comprising:

determining an estimated compressed size for the data chunk using the entropy value.

18. The method of claim 17, wherein any of the entropy value and the estimated compressed size is used in said determining, in accordance with the entropy value for the data chunk, whether the data chunk is compressible.

19. One or more non-transitory computer readable media comprising code stored thereon that, when executed, performs method of data processing comprising:

receiving a data chunk partitioned into N data items;

performing first processing that computes an entropy value for the data chunk, wherein the first processing includes:

determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and performing second processing using the plurality of counters to determine an entropy value for the data chunk, wherein said second processing includes selecting a precomputed binary logarithmic value from a table for each of the plurality of counters; and determining, in accordance with the entropy value for the data chunk, whether the data chunk is compressible; and responsive to determining the data chunk is compressible based on the entropy value for the chunk, compressing the data chunk, wherein a range is defined from a minimum value of zero and a maximum value of N, wherein N denotes a number of data items in the data chunk, and wherein the table includes precomputed binary logarithmic values for each value in the range.

20. The one or more non-transitory computer readable media of claim 19, wherein each of the N data items of the data chunk corresponds to a byte of data in the data chunk.

21. A system comprising:
one or more processors; and
a memory comprising code stored thereon that, when executed, performs a method of data processing comprising:
receiving a data chunk partitioned into N data items;
performing first processing that computes an entropy value for the data chunk, wherein the first processing includes:
determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and
performing second processing using the plurality of counters to determine an entropy value for the data chunk, wherein said second processing includes selecting a precomputed binary logarithmic value from a table for each of the plurality of counters; and
determining, in accordance with the entropy value for the data chunk, whether the data chunk is compressible; and
responsive to determining the data chunk is compressible based on the entropy value for the chunk, compressing the data chunk, wherein a range is defined from a minimum value of zero and a maximum value of N, wherein N denotes a number of data items in the data chunk, and wherein the table includes precomputed binary logarithmic values for each value in the range.

22. The system of claim 21, wherein the plurality of counters for the data chunk are determined with respect to a selected portion of the N data items of the data chunk, wherein said selected portion includes a second number of data items and the second number is less than N and wherein each of the plurality of counters that is associated with a particular data item of the first portion of data items allowable denotes a current frequency of the particular data item in the selected portion.

23. The system of claim 21, wherein each of the N data items of the data chunk corresponds to a byte of data in the data chunk.

24. One or more non-transitory computer readable media comprising code stored thereon that, when executed, performs a method of data processing comprising:
receiving a data chunk including a plurality of data items;
performing first processing that computes an entropy value for the data chunk, wherein the first processing includes:
determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and
performing second processing using the plurality of counters to determine an entropy value for the data chunk, wherein said second processing includes selecting a precomputed binary logarithmic value from a table for each of the plurality of counters; and
determining, in accordance with the entropy value for the data chunk, whether the data chunk is compressible; and
responsive to determining the data chunk is compressible based on the entropy value for the chunk, compressing the data chunk, wherein the data chunk has a size that is a number of bytes, N, a range is defined from a minimum value of zero and a maximum value of N, and wherein the table includes precomputed binary logarithmic values for each value in the range.

25. A system comprising:
one or more processors; and
a memory comprising code stored thereon that, when executed, performs a method of data processing comprising:
receiving a data chunk including a plurality of data items;
performing first processing that computes an entropy value for the data chunk, wherein the first processing includes:
determining a plurality of counters for data items occurring in the data chunk, wherein a first portion of data items allowable in the data chunk are mapped to the plurality of counters, wherein each of the plurality of counters is associated with a particular data item of the first portion of data items allowable and denotes a current frequency of the particular data item in the data chunk; and
performing second processing using the plurality of counters to determine an entropy value for the data chunk, wherein said second processing includes selecting a precomputed binary logarithmic value from a table for each of the plurality of counters; and
determining, in accordance with the entropy value for the data chunk, whether the data chunk is compressible; and
responsive to determining the data chunk is compressible based on the entropy value for the chunk, compressing the data chunk, wherein the data chunk has a size that is a number of bytes, N, a range is defined from a minimum value of zero and a maximum value of N, and wherein the table includes precomputed binary logarithmic values for each value in the range.

* * * * *